US011702096B1

(12) United States Patent
Wells et al.

(10) Patent No.: US 11,702,096 B1
(45) Date of Patent: Jul. 18, 2023

(54) SYSTEMS AND METHODS FOR PROVIDING A GRAPHICAL REPRESENTATION OF FOLLOWING DISTANCES TO AN AUGMENTED REALITY VEHICLE HEADS-UP DISPLAY SYSTEM

(71) Applicant: GM Global Technology Operations LLC, Detroit, MI (US)

(72) Inventors: James W. Wells, Rochester Hills, MI (US); Thomas A. Seder, Fraser, MI (US); Kai-Han Chang, Madison Heights, MI (US); Bahram Khalighi, Holladay, UT (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/704,517

(22) Filed: Mar. 25, 2022

(51) Int. Cl.
*B60W 50/14* (2020.01)
*H04W 4/46* (2018.01)
*B60K 35/00* (2006.01)

(52) U.S. Cl.
CPC ............ *B60W 50/14* (2013.01); *B60K 35/00* (2013.01); *H04W 4/46* (2018.02); *B60K 2370/1529* (2019.05); *B60K 2370/176* (2019.05); *B60K 2370/177* (2019.05); *B60K 2370/179* (2019.05); *B60K 2370/188* (2019.05); *B60K 2370/1868* (2019.05); *B60K 2370/592* (2019.05); *B60K 2370/5915* (2019.05);

(Continued)

(58) Field of Classification Search
CPC ........... B60W 50/14; B60W 2554/804; B60W 2554/4042; B60W 2556/65; B60W 2554/802; B60W 2050/146; B60W 2420/42; H04W 4/46; B60K 35/00; B60K 2370/1529; B60K 2370/177; B60K 2370/176; B60K 2370/188; B60K 2370/5915; B60K 2370/1868; B60K 2370/592; B60K 2370/179

See application file for complete search history.

(56) References Cited

U.S. PATENT DOCUMENTS 4,621,705 A * 11/1986 Etoh ...................... G01S 13/931
340/904
9,180,890 B2 * 11/2015 Lu ...................... B60W 50/0098
(Continued)

FOREIGN PATENT DOCUMENTS

WO WO-2017119541 A1 * 7/2017 ............ B60W 10/18

*Primary Examiner* — Chico A Foxx
(74) *Attorney, Agent, or Firm* — Vivacqua Crane PLLC (57) ABSTRACT

A vehicle type database includes a plurality of vehicle type profiles. Each of the vehicle type profiles is associated with a vehicle type having a vehicle type specific aerodynamic profile and includes optimal following ranges associated with the vehicle type. Each of the optimal following distance ranges is based on the vehicle type specific aerodynamic profile of the vehicle type and a vehicle speed of the vehicle type wherein a trailing vehicle disposed in the optimal following range is configured to operate at an optimal fuel efficiency. A first optimal following distance range is identified based on a first vehicle type and a first vehicle speed using a first vehicle type profile associated with the first vehicle type. A command is issued to the AR vehicle HUD display system to display a graphical representation of the first optimal following distance to overlay an actual view of the road.

20 Claims, 4 Drawing Sheets

(52) U.S. Cl.
CPC ... *B60W 2050/146* (2013.01); *B60W 2420/42* (2013.01); *B60W 2554/4042* (2020.02); *B60W 2554/802* (2020.02); *B60W 2554/804* (2020.02); *B60W 2556/65* (2020.02)

(56) References Cited

U.S. PATENT DOCUMENTS

| | | | |
|---|---|---|---|
| 9,632,507 B1* | 4/2017 | Korn | B60W 30/00 |
| 11,604,475 B2* | 3/2023 | Boehmke | G01S 7/4972 |
| 2013/0187771 A1* | 7/2013 | Rothschild | G08G 1/096716 |
| | | | 340/435 |
| 2015/0226568 A1* | 8/2015 | Ann | G01C 21/3697 |
| | | | 701/400 |
| 2016/0334623 A1* | 11/2016 | Kishi | G09G 5/005 |
| 2019/0361465 A9* | 11/2019 | Switkes | G05D 1/0293 |
| 2021/0170942 A1* | 6/2021 | Mimura | B60Q 1/543 |
| 2021/0197846 A1* | 7/2021 | Thakur | B60Q 1/545 |
| 2022/0105933 A1* | 4/2022 | Shieh | G06V 20/58 |

* cited by examiner

SYSTEMS AND METHODS FOR PROVIDING A GRAPHICAL REPRESENTATION OF FOLLOWING DISTANCES TO AN AUGMENTED REALITY VEHICLE HEADS-UP DISPLAY SYSTEM

INTRODUCTION

The technical field generally relates to vehicles, and more particularly relates to systems and methods for providing a graphical representation of following distances to an augmented reality vehicle heads-up display system of a trailing vehicle.

Different vehicle types typically have different aerodynamic profiles. Examples of different vehicle types include, but are not limited to, a sedan vehicle, a truck vehicle, a pick-up truck vehicle, a hatchback vehicle, a station wagon vehicle, and a sports utility vehicle. When a vehicle travels on a road, an air flow associated with the vehicle is based on the aerodynamic profile of the vehicle type. The air flow associated with the vehicle type creates a low-pressure wake behind the vehicle in accordance with the aerodynamic profile of the vehicle type. The low-pressure wake behind the vehicle varies as a function of the vehicle type, a vehicle speed of the vehicle, and a following distance behind the vehicle.

When a trailing vehicle travels behind a vehicle, the low-pressure wake created behind the leading vehicle reduces an aerodynamic resistance on the front of the trailing vehicle. The reduction of the aerodynamic resistance on the front of the trailing vehicle is based on the vehicle type of the leading vehicle, a vehicle speed of the leading vehicle, and a following distance of the trailing vehicle behind the leading vehicle. The reduction in aerodynamic resistance on the front of the trailing vehicle may correspond to a reduction in fuel consumption by the trailing vehicle. It may be beneficial to provide a graphical representation of optimal following distances that enable a trailing vehicle to operate at an optimal fuel efficiency to an augmented reality (AR) vehicle heads-up display (HUD) system of the trailing vehicle.

SUMMARY

In an embodiment, a system for providing following a graphical representation of following distances to an augmented reality (AR) vehicle heads-up-display (HUD) system of a trailing vehicle includes a processor, a vehicle type database, and a memory. The vehicle type database includes a plurality of vehicle type profiles, each of the plurality of vehicle type profiles being associated with a vehicle type having a vehicle type specific aerodynamic profile and including optimal following ranges associated with the vehicle type, each of the optimal following distance ranges being based on the vehicle type specific aerodynamic profile of the vehicle type and a vehicle speed of the vehicle type wherein a trailing vehicle disposed in the optimal following range is configured to operate at an optimal fuel efficiency. The memory includes instructions that upon execution by the processor, cause the processor to receive a first vehicle type and a first vehicle speed associated with a leading vehicle on a road; identify a first optimal following distance range based on the first vehicle type and the first vehicle speed using a first vehicle type profile associated with the first vehicle type; and issue a command to the AR vehicle HUD display system to display a graphical representation of the first optimal following distance to overlay an actual view of the road.

In an embodiment, the memory further includes instructions that upon execution by the processor, cause the processor to receive a vehicle-to-vehicle (V2V) message from the leading vehicle, the V2V message comprising the first vehicle type associated with the leading vehicle.

In an embodiment the memory further includes instructions that upon execution by the processor, cause the processor to receive a vehicle image of the leading vehicle from a vehicle sensor system of the trailing vehicle; and identify the first vehicle type associated with the leading vehicle based on the vehicle image.

In an embodiment, the memory further includes instructions that upon execution by the processor, cause the processor to receive a V2V message from the leading vehicle, the V2V message comprising the first vehicle speed associated with the leading vehicle.

In an embodiment, the memory further includes instructions that upon execution by the processor, cause the processor to receive the first vehicle speed of the leading vehicle from a vehicle sensor system of the trailing vehicle.

In an embodiment, each of the plurality of vehicle type profiles associated with the vehicle type further comprises hazardous following distance ranges associated with the vehicle type, each of the hazardous following distance ranges being based on the vehicle speed of the vehicle type and disposed in front of the optimal following distance range associated with the vehicle speed; and the memory further includes instructions that upon execution by the processor, cause the processor to: identify a first hazardous following distance range based on the first vehicle type and the first vehicle speed using the first vehicle type profile; and issue the command to the AR vehicle HUD display system to display a graphical representation of the first hazardous following distance range and first optimal following distance range to overlay an actual view of the road.

In an embodiment, the memory further includes instructions that upon execution by the processor, cause the processor to: receive a vehicle location of the trailing vehicle from a vehicle sensor system of the trailing vehicle; receive a vehicle location of the leading vehicle from one of the vehicle sensor system of the trailing vehicle and a V2V message including the vehicle location of the leading vehicle from the leading vehicle; determine a current following distance between the trailing vehicle and the leading vehicle based on the vehicle location of the trailing vehicle and the vehicle location of the leading vehicle; determine a current following distance range disposed in a portion of the current following distance between the trailing vehicle and the optimal following distance range, the trailing vehicle disposed in the current following distance range is configured to operate at a fuel efficiency that is less than the optimal fuel efficiency; and issue the command to the AR vehicle HUD display system to display a graphical representation of the first hazardous following distance, the first optimal following, and the current following distance range to overlay an actual view of the road.

In an embodiment, the memory further includes instructions that upon execution by the processor, cause the processor to issue the command to the AR vehicle HUD display system to display the graphical representation of the first hazardous following distance, the first optimal following, and the current following distance range to overlay an actual view of the road using first, second, and third colors, respectively.

In an embodiment, the memory further includes instructions that upon execution by the processor, cause the processor to issue a command to the AR vehicle HUD display system of one of an electric vehicle and an internal combustion engine vehicle.

In an embodiment, the memory further includes instructions that upon execution by the processor, cause the processor to issue a command to the AR vehicle HUD display system of one of an autonomous vehicle, a semi-autonomous vehicle, and a manually driven vehicle.

In an embodiment, the first vehicle type is one of a sedan vehicle, a truck vehicle, a pick-up truck vehicle, a hatchback vehicle, a station wagon vehicle, and a sports utility vehicle.

In an embodiment, a computer readable medium including instructions stored thereon for providing following a graphical representation of following distances to an augmented reality (AR) vehicle heads-up-display (HUD) system of a trailing vehicle, that upon execution by a processor, cause the processor to: enable access to a vehicle type database including a plurality of vehicle type profiles, each of the plurality of vehicle type profiles being associated with a vehicle type having a vehicle type specific aerodynamic profile and including optimal following ranges associated with the vehicle type, each of the optimal following distance ranges being based on the vehicle type specific aerodynamic profile of the vehicle type and a vehicle speed of the vehicle type wherein a trailing vehicle disposed in the optimal following range is configured to operate at an optimal fuel efficiency; receive a first vehicle type and a first vehicle speed associated with a leading vehicle on a road; identify a first optimal following distance range based on the first vehicle type and the first vehicle speed using a first vehicle type profile associated with the first vehicle type; and issue a command to the AR vehicle HUD display system to display a graphical representation of the first optimal following distance to overlay an actual view of the road.

In an embodiment, the computer readable medium further includes instructions to cause the processor to: enable access to the vehicle type database comprising the plurality of vehicle type profiles, wherein each of the plurality of vehicle type profiles associated with the vehicle type further comprises hazardous following distance ranges associated with the vehicle type, each of the hazardous following distance ranges being based on the vehicle speed of the vehicle type and disposed in front of the optimal following distance range associated with the vehicle speed; identify a first hazardous following distance range based on the first vehicle type and the first vehicle speed using the first vehicle type profile; and issue the command to the AR vehicle HUD display system to display a graphical representation of the first hazardous following distance range and first optimal following distance range to overlay an actual view of the road.

In an embodiment, the computer readable medium further includes instructions to cause the processor to: receive a vehicle location of the trailing vehicle from a vehicle sensor system of the trailing vehicle; receive a vehicle location of the leading vehicle from one of the vehicle sensor system of the trailing vehicle and a V2V message including the vehicle location of the leading vehicle from the leading vehicle; determine a current following distance between the trailing vehicle and the leading vehicle based on the vehicle location of the trailing vehicle and the vehicle location of the leading vehicle; determine a current following distance range disposed in a portion of the current following distance between the trailing vehicle and the optimal following distance range, the trailing vehicle disposed in the current following distance range is configured to operate at a fuel efficiency that is less than the optimal fuel efficiency; and issue the command to the AR vehicle HUD display system to display a graphical representation of the first hazardous following distance, the first optimal following, and the current following distance range to overlay an actual view of the road.

In an embodiment, the computer readable medium further includes instructions to cause the processor to: issue the command to the AR vehicle HUD display system to display the graphical representation of the first hazardous following distance, the first optimal following, and the current following distance range to overlay an actual view of the road using first, second, and third colors, respectively.

In an embodiment, the computer readable medium further includes instructions to cause the processor to issue a command to the AR vehicle HUD display system of one of an electric vehicle and an internal combustion engine vehicle.

In an embodiment, a method for providing a graphical representation of following distances to an augmented reality (AR) vehicle heads-up-display (HUD) system of a trailing vehicle includes: enabling access to a vehicle type database comprising a plurality of vehicle type profiles, each of the plurality of vehicle type profiles being associated with a vehicle type having a vehicle type specific aerodynamic profile and including optimal following ranges associated with the vehicle type, each of the optimal following distance ranges being based on the vehicle type specific aerodynamic profile of the vehicle type and a vehicle speed of the vehicle type wherein a trailing vehicle disposed in the optimal following range is configured to operate at an optimal fuel efficiency; receiving a first vehicle type and a first vehicle speed associated with a leading vehicle on a road; identifying a first optimal following distance range based on the first vehicle type and the first vehicle speed using a first vehicle type profile associated with the first vehicle type; and issuing a command to the AR vehicle HUD display system to display a graphical representation of the first optimal following distance to overlay an actual view of the road.

In an embodiment, the method further includes: enabling access to the vehicle type database comprising the plurality of vehicle type profiles, wherein each of the plurality of vehicle type profiles associated with the vehicle type further comprises hazardous following distance ranges associated with the vehicle type, each of the hazardous following distance ranges being based on the vehicle speed of the vehicle type and disposed in front of the optimal following distance range associated with the vehicle speed; identifying a first hazardous following distance range based on the first vehicle type and the first vehicle speed using the first vehicle type profile; and issuing the command to the AR vehicle HUD display system to display a graphical representation of the first hazardous following distance range and first optimal following distance range to overlay an actual view of the road.

In an embodiment, the method further includes: receiving a vehicle location of the trailing vehicle from a vehicle sensor system of the trailing vehicle; receiving a vehicle location of the leading vehicle from one of the vehicle sensor system of the trailing vehicle and a V2V message including the vehicle location of the leading vehicle from the leading vehicle; determining a current following distance between the trailing vehicle and the leading vehicle based on the vehicle location of the trailing vehicle and the vehicle location of the leading vehicle; determining a current following distance range disposed in a portion of the current following distance between the trailing vehicle and the optimal following distance range, the trailing vehicle disposed in the current following distance range is configured to operate at a fuel efficiency that is less than the optimal fuel efficiency; and issuing the command to the AR vehicle HUD display system to display a graphical representation of the first hazardous following distance, the first optimal following, and the current following distance range to overlay an actual view of the road.

In an embodiment, the method further includes issuing the command to the AR vehicle HUD display system to display the graphical representation of the first hazardous following distance, the first optimal following, and the current following distance range to overlay an actual view of the road using first, second, and third colors, respectively.

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
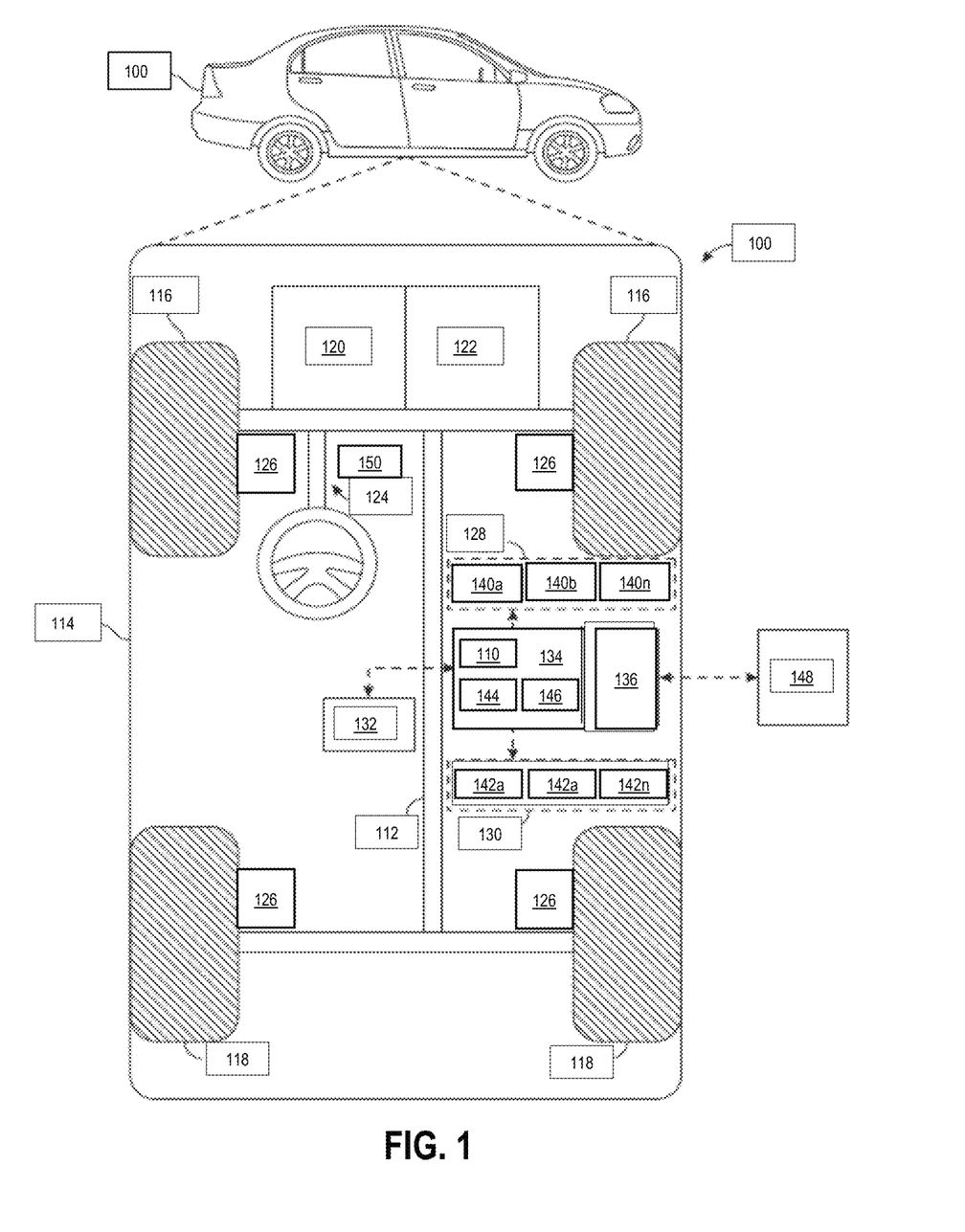
FIG. 1 is a functional block diagram representation of a vehicle including an embodiment of a following distance generation system.

Referring to FIG. 1, a functional block diagram representation of a trailing vehicle 100 including an embodiment of a following distance generation system 110 is shown. The trailing vehicle 100 generally includes a chassis 112, a body 114, front wheels 116, and rear wheels 118. The body 114 is arranged on the chassis 112 and substantially encloses components of the trailing vehicle 100. The body 114 and the chassis 112 may jointly form a frame. The front wheels 116 and the rear wheels 118 are each rotationally coupled to the chassis 112 near a respective corner of the body 114.

The trailing vehicle 100 may, for example, be a vehicle that is automatically controlled to carry passengers from one location to another. While an autonomous vehicle is depicted in the illustrated embodiment as a passenger car, other examples of autonomous vehicles include, but are not limited to, motorcycles, trucks, sport utility vehicles (SUVs), recreational vehicles (RVs), marine vessels, and aircraft.

In an embodiment, the trailing vehicle 100 may be a so-called a Level One, a Level Two, a Level Three, Level Four, or Level Five automation system. A Level Five system indicates "full automation," referring to the full-time performance by an ADS of all aspects of the dynamic driving task under all roadway and environmental conditions that can be managed by a human driver. A Level Four system indicates "high automation", referring to the driving mode-specific performance by an automated driving system (ADS) of all aspects of the dynamic driving task, even if a human driver does not respond appropriately to a request to intervene. In Level Three vehicles, the vehicle systems perform the entire dynamic driving task (DDT) within the area that it is designed to do so. The vehicle operator is only expected to be responsible for the DDT-fallback when the trailing vehicle 100 essentially "asks" the driver to take over if something goes wrong or the vehicle is about to leave the zone where it is able to operate. In Level Two vehicles, systems provide steering, brake/acceleration support, lane centering, and adaptive cruise control. In Level One vehicles, the driver employs full control over vehicle operations.

As shown, the trailing vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the trailing vehicle 100. Examples of vehicle sensing devices 140a-140n include, but are not limited to, radars, lidars, global positioning systems, optical cameras, thermal cameras, ultrasonic sensors, and/or other sensors. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

A display 150 is configured to display information to the user (e.g., vehicle operator or passenger) and may be an augmented reality (AR) display. In the present disclosure, the term "AR display" means a display that presents information to users, while still allowing sight of the outside world. In certain embodiments, the display 150 may be configured as a heads-up display (HUD) system 150, and/or an information cluster display 150. Accordingly, the display 150 may be an AR vehicle HUD system 150 or an AR information cluster display 150. In an AR vehicle HUD system150, images are projected on a windshield of the trailing vehicle 100. In an AR information cluster display 150, the information cluster panel of the trailing vehicle 100 includes a screen that presents an image of the front of the trailing vehicle 100 captured by one or more cameras 41 (i.e., a forward image) and virtual images presented on that forward image.

The vehicle communication system 136 is configured to wirelessly communicate information to and from other entities 148 ("vehicle-to-everything (V2X) communication), such as for example, but not limited to, other vehicles ("V2V" communication,) infrastructure ("vehicle-to-infrastructure (V2I)" communication), remote systems, and/or personal devices. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the trailing vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes the following distance generation system 110. The processor 144 can be any custom made or commercially available processor, a central processing unit (CPU), a graphics processing unit (GPU), an auxiliary processor among several processors associated with the controller 134, a semiconductor-'based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the trailing vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the trailing vehicle 100, and generate control signals to the actuator system 130 to automatically control one or more components of the trailing vehicle based on the logic, calculations, methods, and/or algorithms. Although only one controller 134 is shown in FIG. 1, alternative embodiments of the trailing vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the trailing vehicle 100.

In various embodiments, one or more instructions of the controller 134 are embodied to provide ADS functions as described with reference to one or more of the embodiments herein. The controller 134 or one of its functional modules is configured to implement the functions described with reference to the following distance generation system 110.

While FIG. 1 illustrates the trailing vehicle 100 as an autonomous vehicle, the trailing vehicle 100 may be one of an autonomous vehicle, a semi-autonomous vehicle, and a manual driving vehicle. In an embodiment, the trailing vehicle 100 is an electric vehicle. In an embodiment, the trailing vehicle 100 is an internal combustion engine vehicle. The trailing vehicle 100 is one of a Level One, Level Two, Level Three, Level Four, and Level Five vehicle.

Figure 2:
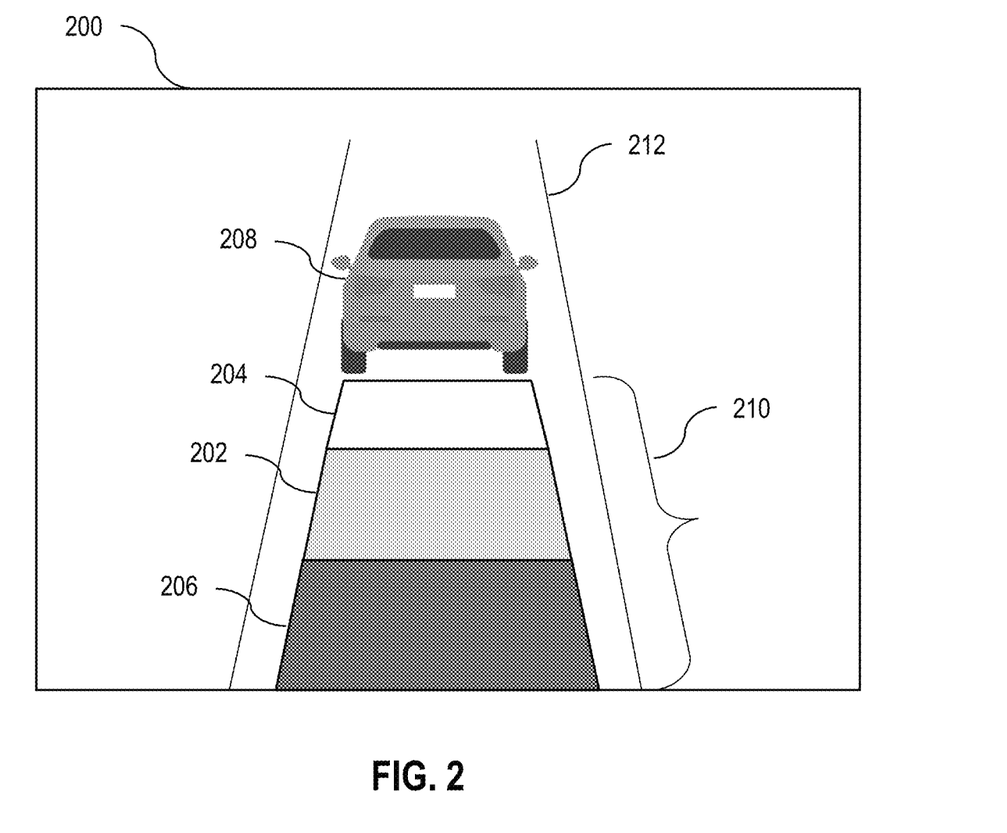
FIG. 2 is a functional block diagram representation of a windshield with an example of embodiment of a graphical representation of following distance ranges overlayed on an actual view of a road.

Referring to FIG. 2, a functional block diagram representation of a windshield 200 of a trailing vehicle 100 with an example of embodiment of a graphical representation of an optimal following distance range 202, a hazardous following distance range 204, and a current following distance range 206 with respect to a leading vehicle 208 overlayed on an actual view of a current following distance 210 on a road 212 is shown. An embodiment of a following distance generation system 110 at the trailing vehicle 100 is configured to generate the graphical representation of the optimal following distance range 202, the hazardous following distance range 204, and the current following distance range 206 and provide the graphical representation of the following distance ranges 202, 204, 206 to an AR vehicle HUD system 150 for display on the windshield 200 of the trailing vehicle 100. In an embodiment, the following distance generation system 110 is configured to generate the graphical representation of the optimal following distance range 202, the hazardous following distance range 204, and the current following distance range 206 using a different color to depict each of the different following distance ranges 202, 204, 206.

The leading vehicle 208 is associated with a vehicle type. Examples of vehicle types include, but are not limited to, a sedan vehicle, a truck vehicle, a pick-up truck vehicle, a hatchback vehicle, a station wagon vehicle, and a sports utility vehicle. Each vehicle type has a different aerodynamic profile. An air flow associated with a vehicle type is based on the aerodynamic profile of that vehicle type. The air flow associated with a vehicle type creates a low-pressure wake behind the leading vehicle 208 of the vehicle type in accordance with the aerodynamic profile of the vehicle type. The low-pressure wake behind the leading vehicle 208 varies as a function of the vehicle type of the leading vehicle 208, a vehicle speed of the leading vehicle 208, and a following distance behind the leading vehicle 208.

The low-pressure wake created behind the leading vehicle 208 reduces the aerodynamic resistance on the front of the trailing vehicle 100 disposed behind the leading vehicle 208. The reduction of the aerodynamic resistance on the front of the trailing vehicle 100 is based on the vehicle type of the leading vehicle 208, a vehicle speed of the leading vehicle 208, and a following distance of the trailing vehicle 100 behind the leading vehicle 208. The reduction in aerodynamic resistance on the front of the trailing vehicle 100 corresponds to a reduction in fuel consumption by the trailing vehicle 100. The fuel consumption by the trailing vehicle 100 corresponds to a fuel efficiency of the trailing vehicle 100. For a particular vehicle type of a leading vehicle 208 traveling at a given vehicle speed, different following distance ranges are associated with different fuel efficiencies.

While fuel efficiencies of the trailing vehicle 100 may increase as the following distance between the trailing vehicle 100 and the leading vehicle 208 decreases, if the trailing vehicle 100 travels withing the hazardous following distance range 204 behind the leading vehicle 208, there may be a risk of collision between the trailing vehicle 100 and the leading vehicle 208. The hazardous following distance range 204 for a particular vehicle type of leading vehicle 208 varies as a function of a vehicle speed of the leading vehicle 208. An optimal following distance range 202 of the trailing vehicle 100 behind the leading vehicle 208 is associated with an optimal fuel efficiency at the trailing vehicle 100 while maintaining a following distance behind the hazardous following distance range 204.

The current following distance range 206 is disposed in the portion of the current following distance 210 between the trailing vehicle 100 and the optimal following distance range 202. The fuel efficiency of the trailing vehicle 100 operating in the current following distance range 206 is less than the fuel efficiency of the trailing vehicle 100 operating in the optimal following distance range 202.

In an embodiment, the trailing vehicle 100 is an autonomous vehicle 100. The following distance generation system 110 is configured to generate the graphical representation of the optimal following distance range 202, the hazardous following distance range 204, and the current following distance range 206 and provide the graphical representation of the following distance ranges 202, 204, 206 to the AR vehicle HUD system 150 for display on the windshield 200 of the autonomous vehicle 100. In an embodiment, the following distance generation system 110 provides the optimal following distance range 202, the hazardous following distance range 204, and the current following distance range 206 to the ADS of the autonomous vehicle 100. The ADS implements guidance actions at the autonomous vehicle 100 to guide the autonomous vehicle 100 from the current following distance range 206 into the optimal following distance range 200 behind the leading vehicle 208.

In an embodiment, the trailing vehicle is non-autonomous vehicle that is manually driven by a driver. The following distance generation system 110 is configured to generate the graphical representation of the optimal following distance range 202, the hazardous following distance range 204, and the current following distance range 206 and provide the graphical representation of the following distance ranges 202, 204, 206 to the AR vehicle HUD system 150 for display on the windshield 200 of the non-autonomous vehicle 100. The graphical representation of the optimal following distance range 202, the hazardous following distance range 204, and the current following distance range 206 may provide guidance to the driver to manually guide the trailing vehicle from the current following distance range 206 into the optimal following distance range 200 behind the leading vehicle 208.

In an embodiment, the trailing vehicle is semi-autonomous vehicle that may for example include an adaptive cruise control system. The following distance generation system 110 is configured to generate the graphical representation of the optimal following distance range 202, the hazardous following distance range 204, and the current following distance range 206 and provide the graphical representation of the following distance ranges 202, 204, 206 to the AR vehicle HUD system 150 for display on the windshield 200 of the semi-autonomous vehicle 100. In an embodiment, the following distance generation system 110 provides the optimal following distance range 202, the hazardous following distance range 204, and the current following distance range 206 to the adaptive cruise control system of the semi-autonomous vehicle. The adaptive cruise control system adjusts the speed of the semi-autonomous vehicle to guide the semi-autonomous vehicle from the current following distance range 206 into the optimal following distance range 200 behind the leading vehicle 208.

Figure 3:
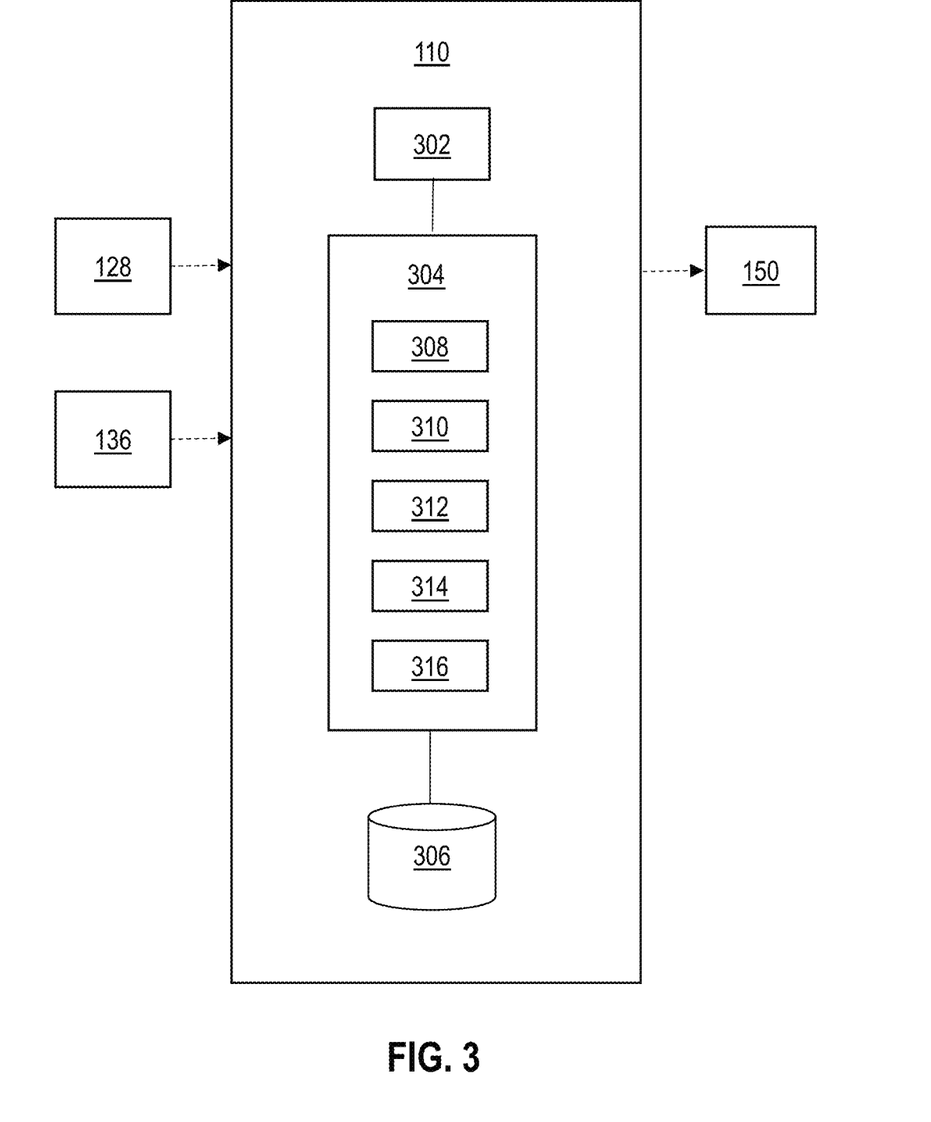
FIG. 3 is a block diagram representation of an embodiment of a following distance generation system.

Referring to FIG. 3, a block diagram representation of an embodiment of a following distance generation system 110 is shown. The following distance generation system 110 is configured to be communicatively coupled to an AR vehicle HUD system 150 of the trailing vehicle 100. In an embodiment, the following distance generation system 110 is configured to be communicatively coupled to a vehicle sensor system 128 of the trailing vehicle 100. In an embodiment, the following distance generation system 110 is configured to be communicatively coupled to a vehicle communication system 136 of the trailing vehicle 100. In an embodiment, the following distance generation system 110 is configured to be communicatively coupled to a vehicle sensor system 128 and a vehicle communication system 136 of the trailing vehicle 100.

The following distance generation system 110 includes a processor 302, a memory 304, and a vehicle type database 306. The vehicle type database 306 includes a plurality of vehicle type profiles. Each of the vehicle type profiles is associated with a different vehicle type. Examples of vehicle types include, but are not limited to, a sedan vehicle, a truck vehicle, a pick-up truck vehicle, a hatchback vehicle, a station wagon vehicle, and a sports utility vehicle.

Each vehicle type has a different aerodynamic profile. An air flow associated with a vehicle type is based on the aerodynamic profile of that vehicle type. The air flow associated with a vehicle type creates a low-pressure wake behind the leading vehicle 208 of the vehicle type in accordance with the aerodynamic profile of the vehicle type. The low-pressure wake behind the leading vehicle 208 varies as a function of the vehicle type of the leading vehicle 208, a vehicle speed of the leading vehicle 208, and a following distance behind the leading vehicle 208.

The low-pressure wake created behind the leading vehicle 208 reduces the aerodynamic resistance on the front of a trailing vehicle 100 disposed behind the leading vehicle 208. The reduction of the aerodynamic resistance on the front of the trailing vehicle 100 is based on the vehicle type of the leading vehicle 208, a vehicle speed of the leading vehicle 208, and a following distance of the trailing vehicle 100 behind the leading vehicle 208.

The reduction in aerodynamic resistance on the front of the trailing vehicle 100 corresponds to a reduction in fuel consumption by the trailing vehicle 100. The fuel consumption by the trailing vehicle 100 corresponds to a fuel efficiency of the trailing vehicle 100. For a particular vehicle type of a leading vehicle 208 traveling at a given vehicle speed, different following distance ranges are associated with different fuel efficiencies.

While fuel efficiencies of the trailing vehicle 100 may increase as the following distance between the trailing vehicle 100 and the leading vehicle 208 decreases, if the trailing vehicle 100 travels withing a hazardous following distance range 204 behind the leading vehicle 208, there may be a risk of collision between the trailing vehicle 100 and the leading vehicle 208. The hazardous following distance range 204 for a particular vehicle type of leading vehicle varies as a function of a vehicle speed of the leading vehicle 208. An optimal following distance range 202 of the trailing vehicle 100 behind the leading vehicle 208 is associated with an optimal fuel efficiency at the trailing vehicle 100 while maintaining a following distance behind the hazardous following distance range 204.

Each vehicle type profile associated with a vehicle type defines the optimal following distance ranges 202 and hazardous following distance ranges 204 for different vehicle speeds of that vehicle type. The vehicle type profile associated with each of the vehicle types is a pre-defined vehicle type profile that is provided to the trailing vehicle 100. Each vehicle type profile associated with a vehicle type is stored in the vehicle type database 306.

In an embodiment, the memory 304 includes a vehicle type module 308, a vehicle speed module 310, an optimal following distance range module 312, a current following distance module 314, and a graphical display generation module 316. The vehicle type module 308 is configured to determine a vehicle type of a leading vehicle 208 disposed in front of the trailing vehicle 100. Examples of vehicle types include, but are not limited to, a sedan vehicle, a truck vehicle, a pick-up truck vehicle, a hatchback vehicle, a station wagon vehicle, and a sports utility vehicle.

In an embodiment, the vehicle sensor system 128 of the trailing vehicle 100 is configured to capture a vehicle image of the leading vehicle 208. The optical camera 140 of the vehicle sensor system 128 is configured to capture the vehicle image. The vehicle type module 308 is configured to compare the vehicle features of the leading vehicle 208 in the vehicle image with pre-defined vehicle features associated with each of the different vehicle types to determine the vehicle type of the leading vehicle 208 in the vehicle image.

In an embodiment, the vehicle communication system 136 of the trailing vehicle 100 is configured to receive a V2V message from the leading vehicle 208. The V2V message includes the vehicle type of the leading vehicle 208. The vehicle type module 308 is configured to receive the vehicle type of the leading vehicle 208 in the V2V message.

The vehicle speed module 310 is configured to receive a vehicle speed of the leading vehicle 208. In an embodiment, the vehicle sensor system 128 is configured to measure the vehicle speed of the leading vehicle 208. In an embodiment, a radar 140 of the vehicle sensor system 128 is configured to detect the vehicle speed of the leading vehicle 208. In an embodiment, a lidar 140 of the vehicle sensor system 128 is configured to detect the vehicle speed of the leading vehicle 208. In an embodiment, the radar 140 and the lidar of the vehicle sensor system 128 are configured to detect the vehicle speed of the leading vehicle 208. The vehicle speed module 310 is configured to receive the vehicle speed of the leading vehicle 208 detected by the vehicle sensor system 128.

In an embodiment, the vehicle communication system 136 of the trailing vehicle 100 is configured to receive a V2V message from the leading vehicle 208. The V2V message includes the vehicle speed of the leading vehicle 208. The vehicle speed module 310 is configured to receive the vehicle speed of the leading vehicle 208 in the V2V message.

The optimal following distance range module 312 is configured to determine an optimal following distance range 202 of the trailing vehicle 100 behind the leading vehicle 208. The optimal following distance module 312 is configured to receive the vehicle type of the leading vehicle 208 from the vehicle type module 308 and the vehicle speed of the leading vehicle 208 from the vehicle speed module 310.

The optimal following distance module 312 is configured to access the vehicle type database 306 to retrieve the vehicle type profile associated with the vehicle type of the leading vehicle 208. The vehicle type profile defines the optimal following distance ranges 202 for different vehicle speeds of the vehicle type of the leading vehicle 208. The optimal following distance module 312 is configured to determine the optimal following distance range 202 associated with the vehicle speed of the leading vehicle based on the vehicle type profile. The trailing vehicle 100 operates at an optimal fuel efficiency when the trailing vehicle 100 is disposed in the optimal following distance range 202.

The current following distance module 314 determines a current following distance 210 of the trailing vehicle 100 with respect to the leading vehicle 208. In an embodiment, the vehicle sensor system 128 of the trailing vehicle 100 is configured to detect a vehicle location of the leading vehicle 208 and a vehicle location of the trailing vehicle 100. The current following distance module 312 is configured to receive the vehicle location of the leading vehicle 208 and the vehicle location of the trailing vehicle 100 from the vehicle sensor system 128. The current following distance module 312 is configured to determine the current following distance 210 of the trailing vehicle 100 with respect to the leading vehicle 208 based on the vehicle location of the leading vehicle 208 and the vehicle location of the trailing vehicle 100.

In an embodiment, the vehicle communication system 136 of the trailing vehicle 100 is configured to receive a V2V message from the leading vehicle 208. The V2V message includes the vehicle location of the leading vehicle 208. The vehicle sensor system 128 of the trailing vehicle 100 is configured to detect the vehicle location of the trailing vehicle 100. The current following distance module 312 is configured to receive the vehicle location of the leading vehicle 208 from V2V message and the vehicle location of the trailing vehicle 100 from the vehicle sensor system 128. The current following distance module 312 is configured to determine the current following distance 210 of the trailing vehicle 100 with respect to the leading vehicle 208 based on the vehicle location of the leading vehicle 208 and the vehicle location of the trailing vehicle 100.

The graphical display generation module 316 is configured to issue a command to the AR vehicle HUD system 150 of the trailing vehicle 100 to display a graphical representation of a current following distance range 206, the optimal following distance range 202, and the hazardous following distance range 204. The graphical display generation module 316 receives the optimal following distance range 202 from the optical following distance module 312 and the current following distance 210 from the current following distance module 314.

The hazardous following distance range 204 is disposed in the portion of the current following distance 210 between the leading vehicle 208 and the optimal following distance range 202. The current following distance range 206 is disposed in the portion of the current following distance 210 between the trailing vehicle 100 and the optimal following distance range 202. The fuel efficiency of the trailing vehicle 100 operating in the current following distance range 206 is less than the fuel efficiency of the trailing vehicle 100 operating in the optimal following distance range 202.

The graphical display generation module 316 is configured to issue the command to the AR vehicle HUD system 150 to display the graphical representation of the current following distance range 206, the optimal following distance range 202, and the hazardous following distance range 204 to overlay an actual view of the road 212 on the windshield 200 of the trailing vehicle 100. In an embodiment, the graphical display generation module 316 is configured to issue a command to the AR vehicle HUD system 150 to use a different color to display the graphical representation of each of the current following distance range 206, the optimal following distance range 202, and the hazardous following distance range 204 to overlay the actual view of the road 212 on the windshield 200 of the trailing vehicle 100.

While a number of different components of the following distance generation system 110 have been described, alternative embodiments may include additional components that facilitate operation of the following distance generation system 110. While one configuration of the following distance generation system 110 has been described, alternative embodiments may include alternative configurations operable to implement the functions of the following distance generation system 110 described above.

Figure 4:
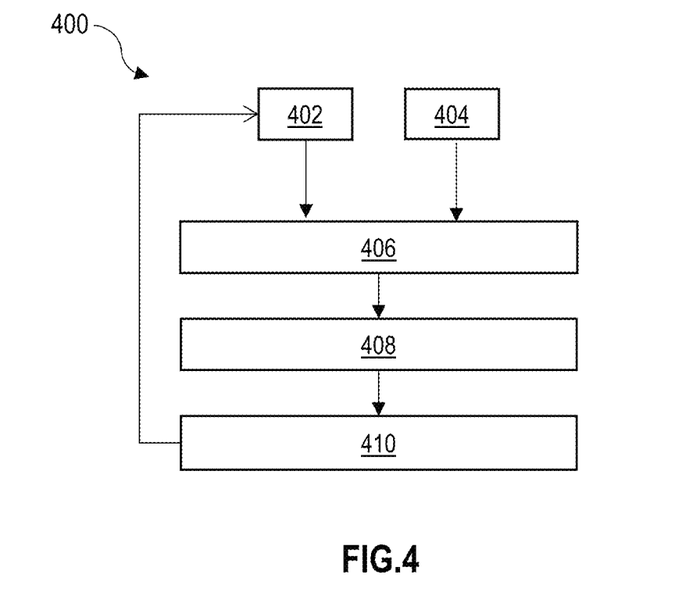
FIG. 4 is a flow chart representation of an example of a method of generating a graphical representation of following distance ranges using an embodiment of a following distance generation system.

Referring to FIG. 4, a flow chart representation of an example of a method 400 of generating a graphical representation of following distance ranges 202, 204, 206 using an embodiment of a following distance generation system 110 is shown. The following distance generation system 110 is disposed at a trailing vehicle 100. The method 500 may be performed by hardware circuitry, firmware, software, and/or combinations thereof.

At 402, the following distance generation system 110 determines a vehicle type of a leading vehicle 208 disposed in front of the trailing vehicle 100. Examples of vehicle types include, but are not limited to, a sedan vehicle, a truck vehicle, a pick-up truck vehicle, a hatchback vehicle, a station wagon vehicle, and a sports utility vehicle. At 404, the following distance generation system 110 determines a vehicle speed of the leading vehicle 208.

At 406, the following distance generation system 110 determines an optimal following distance range 202 of the trailing vehicle 100 behind the leading vehicle 208 based on the vehicle type of the leading vehicle 208 and the vehicle speed of the leading vehicle 208. The following distance generation system 110 is configured to access the vehicle type database 306 to retrieve the vehicle type profile associated with the vehicle type of the leading vehicle 208. The vehicle type profile defines the optimal following distance ranges 202 for different vehicle speeds of the vehicle type of the leading vehicle 208. The following distance generation system 110 is configured to determine the optimal following distance range 202 associated with the vehicle speed of the leading vehicle based on the vehicle type profile. The trailing vehicle 100 operates at an optimal fuel efficiency when the trailing vehicle 100 is operating in the optimal following distance range 202.

At 408, the following distance generation system 110 determines a current following distance 210 of the trailing vehicle 100 with respect to the leading vehicle 208.

At 410, the following distance generation system 110 issues a command to the AR vehicle HUD system 150 of the trailing vehicle 100 to display a graphical representation of a current following distance range 206, the optimal following distance range 202, and the hazardous following distance range 204. The hazardous following distance range 204 is disposed in the portion of the current following distance 210 between the leading vehicle 208 and the optimal following distance range 202. The current following distance range 206 is disposed in the portion of the current following distance 210 between the trailing vehicle 100 and the optimal following distance range 202. The fuel efficiency of the trailing vehicle 100 operating in the current following distance range 206 is less than the fuel efficiency of the trailing vehicle 100 operating in the optimal following distance range 202. In an embodiment, following distance generation system 110 is configured to issue a command to the AR vehicle HUD 150 to use a different color to display the graphical representation of each of the current following distance range 206, the optimal following distance range 202, and the hazardous following distance range 204 to overlay the actual view of the road 212 on the windshield 200 of the trailing vehicle 100.

The method 400 returns to 402 and the method 400 is repeated. The following distance generation system 110 generates an updated vehicle type of the leading vehicle 208, an updated vehicle speed of the leading vehicle 208, and an updated current following distance of the trailing vehicle 100 behind the leading vehicle 208. The following distance generation system 110 issues a command to the AR vehicle HUD system 150 of the trailing vehicle 100 to display an updated graphical representation of the updated current following distance range 206, the updated optimal following distance range 202, and the updated hazardous following distance range 204. The following distance generation system 110 dynamically updates the graphical representation of the updated current following distance range 206, the updated optimal following distance range 202, and the updated hazardous following distance range 204 on based on the updated vehicle type of the leading vehicle 208, the updated vehicle speed of the leading vehicle 208, and the updated current following distance of the trailing vehicle 100 behind the leading vehicle 208.

Figure 5:
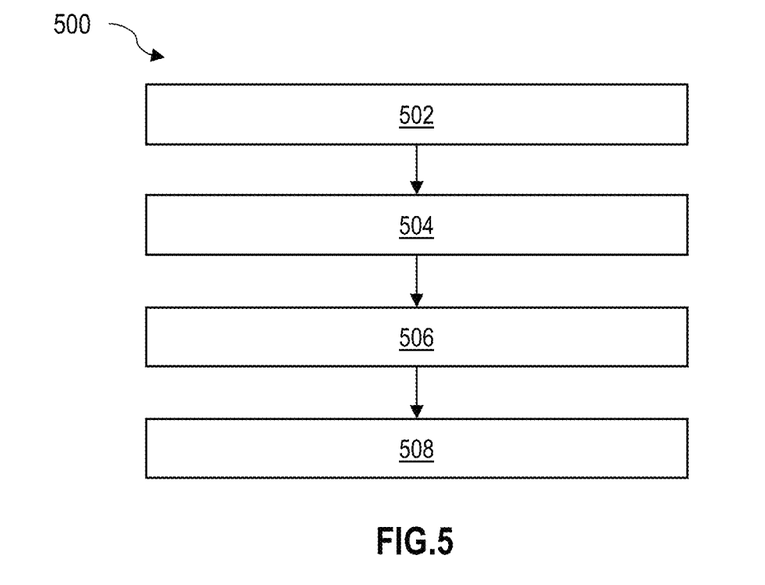
FIG. 5 is a flow chart representation of an example of a method for providing a graphical representation of following distances to an augmented reality (AR) vehicle heads-up-display (HUD) system of a trailing vehicle.

Referring to FIG. 5, a flow chart representation of an example of a method 500 for providing a graphical representation of following distances to an augmented reality (AR) vehicle heads-up-display (HUD) system 150 of a trailing vehicle 100 is shown. The method 500 may be performed by hardware circuitry, firmware, software, and/or combinations thereof.

At 502, access is provided to a vehicle type database 306 including a plurality of vehicle type profiles. Each of the plurality of vehicle type profiles is associated with a vehicle type having a vehicle type specific aerodynamic profile and including optimal following ranges 202 associated with the vehicle type. Each of the optimal following distance ranges 202 is based on the vehicle type specific aerodynamic profile of the vehicle type and a vehicle speed of the vehicle type. A trailing vehicle 100 disposed in the optimal following range 202 is configured to operate at an optimal fuel efficiency.

At 504, a first vehicle type and a first vehicle speed associated with a leading vehicle 208 on a road 212 is received at a following distance generation system 110. At 506, a first optimal following distance range 202 is identified based on the first vehicle type and the first vehicle speed using a first vehicle type profile associated with the first vehicle type. At 508, a command is issued to the AR vehicle HUD display system 150 to display a graphical representation of the first optimal following distance 202 to overlay an actual view of the road 212.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof.

What is claimed is:

1. A system for providing following a graphical representation of following distances to an augmented reality (AR) vehicle heads-up-display (HUD) system of a trailing vehicle comprising:
    a processor;
    a vehicle type database comprising a plurality of vehicle type profiles, each of the plurality of vehicle type profiles being associated with a vehicle type having a vehicle type specific aerodynamic profile and including optimal following ranges associated with the vehicle type, each of the optimal following distance ranges being based on the vehicle type specific aerodynamic profile of the vehicle type and a vehicle speed of the vehicle type wherein a trailing vehicle disposed in the optimal following range is configured to operate at an optimal fuel efficiency; and
    a memory, the memory comprising instructions that upon execution by the processor, cause the processor to:
        receive a first vehicle type and a first vehicle speed associated with a leading vehicle on a road;
        identify a first optimal following distance range based on the first vehicle type and the first vehicle speed using a first vehicle type profile associated with the first vehicle type; and
        issue a command to the AR vehicle HUD display system to display a graphical representation of the first optimal following distance to overlay an actual view of the road.

2. The system of claim 1, wherein the memory further comprises instructions that upon execution by the processor, cause the processor to receive a vehicle-to-vehicle (V2V) message from the leading vehicle, the V2V message comprising the first vehicle type associated with the leading vehicle.

3. The system of claim 1, wherein the memory further comprises instructions that upon execution by the processor, cause the processor to:
    receive a vehicle image of the leading vehicle from a vehicle sensor system of the trailing vehicle; and
    identify the first vehicle type associated with the leading vehicle based on the vehicle image.

4. The system of claim 1, wherein the memory further comprises instructions that upon execution by the processor, cause the processor to receive a V2V message from the leading vehicle, the V2V message comprising the first vehicle speed associated with the leading vehicle.

5. The system of claim 1, wherein the memory further comprises instructions that upon execution by the processor, cause the processor to receive the first vehicle speed of the leading vehicle from a vehicle sensor system of the trailing vehicle.

6. The system of claim 1, wherein each of the plurality of vehicle type profiles associated with the vehicle type further comprises hazardous following distance ranges associated with the vehicle type, each of the hazardous following distance ranges being based on the vehicle speed of the vehicle type and disposed in front of the optimal following distance range associated with the vehicle speed; and
    the memory further comprises instructions that upon execution by the processor, cause the processor to:
        identify a first hazardous following distance range based on the first vehicle type and the first vehicle speed using the first vehicle type profile; and
        issue the command to the AR vehicle HUD display system to display a graphical representation of the first hazardous following distance range and first optimal following distance range to overlay an actual view of the road.

7. The system of claim 6, wherein the memory further comprises instructions that upon execution by the processor, cause the processor to:
    receive a vehicle location of the trailing vehicle from a vehicle sensor system of the trailing vehicle;
    receive a vehicle location of the leading vehicle from one of the vehicle sensor system of the trailing vehicle and a V2V message including the vehicle location of the leading vehicle from the leading vehicle;
    determine a current following distance between the trailing vehicle and the leading vehicle based on the vehicle location of the trailing vehicle and the vehicle location of the leading vehicle;
    determine a current following distance range disposed in a portion of the current following distance between the trailing vehicle and the optimal following distance range, the trailing vehicle disposed in the current following distance range is configured to operate at a fuel efficiency that is less than the optimal fuel efficiency; and issue the command to the AR vehicle HUD display system to display a graphical representation of the first hazardous following distance, the first optimal following, and the current following distance range to overlay an actual view of the road.

8. The system of claim 7, wherein the memory further comprises instructions that upon execution by the processor, cause the processor to issue the command to the AR vehicle HUD display system to display the graphical representation of the first hazardous following distance, the first optimal following, and the current following distance range to overlay an actual view of the road using first, second, and third colors, respectively.

9. The system of claim 1, wherein the memory further comprises instructions that upon execution by the processor, cause the processor to issue a command to the AR vehicle HUD display system of one of an electric vehicle and an internal combustion engine vehicle.

10. The system of claim 1, wherein the memory further comprises instructions that upon execution by the processor, cause the processor to issue a command to the AR vehicle HUD display system of one of an autonomous vehicle, a semi-autonomous vehicle, and a manually driven vehicle.

11. The system of claim 1, wherein the first vehicle type is one of a sedan vehicle, a truck vehicle, a pick-up truck vehicle, a hatchback vehicle, a station wagon vehicle, and a sports utility vehicle.

12. A non-transitory computer readable medium comprising instructions stored thereon for providing following a graphical representation of following distances to an augmented reality (AR) vehicle heads-up-display (HUD) system of a trailing vehicle, that upon execution by a processor, cause the processor to:

enable access to a vehicle type database comprising a plurality of vehicle type profiles, each of the plurality of vehicle type profiles being associated with a vehicle type having a vehicle type specific aerodynamic profile and including optimal following ranges associated with the vehicle type, each of the optimal following distance ranges being based on the vehicle type specific aerodynamic profile of the vehicle type and a vehicle speed of the vehicle type wherein a trailing vehicle disposed in the optimal following range is configured to operate at an optimal fuel efficiency;

receive a first vehicle type and a first vehicle speed associated with a leading vehicle on a road;

identify a first optimal following distance range based on the first vehicle type and the first vehicle speed using a first vehicle type profile associated with the first vehicle type; and issue a command to the AR vehicle HUD display system to display a graphical representation of the first optimal following distance to overlay an actual view of the road.

13. The computer readable medium of claim 12, further comprising instructions to cause the processor to:

enable access to the vehicle type database comprising the plurality of vehicle type profiles, wherein each of the plurality of vehicle type profiles associated with the vehicle type further comprises hazardous following distance ranges associated with the vehicle type, each of the hazardous following distance ranges being based on the vehicle speed of the vehicle type and disposed in front of the optimal following distance range associated with the vehicle speed;

identify a first hazardous following distance range based on the first vehicle type and the first vehicle speed using the first vehicle type profile; and issue the command to the AR vehicle HUD display system to display a graphical representation of the first hazardous following distance range and first optimal following distance range to overlay an actual view of the road.

14. The computer readable medium of claim 13, further comprising instructions to cause the processor to:

receive a vehicle location of the trailing vehicle from a vehicle sensor system of the trailing vehicle;

receive a vehicle location of the leading vehicle from one of the vehicle sensor system of the trailing vehicle and a V2V message including the vehicle location of the leading vehicle from the leading vehicle;

determine a current following distance between the trailing vehicle and the leading vehicle based on the vehicle location of the trailing vehicle and the vehicle location of the leading vehicle;

determine a current following distance range disposed in a portion of the current following distance between the trailing vehicle and the optimal following distance range, the trailing vehicle disposed in the current following distance range is configured to operate at a fuel efficiency that is less than the optimal fuel efficiency; and issue the command to the AR vehicle HUD display system to display a graphical representation of the first hazardous following distance, the first optimal following, and the current following distance range to overlay an actual view of the road.

15. The computer readable medium of claim 14, further comprising instructions to cause the processor to issue the command to the AR vehicle HUD display system to display the graphical representation of the first hazardous following distance, the first optimal following, and the current following distance range to overlay an actual view of the road using first, second, and third colors, respectively.

16. The computer readable medium of claim 12, further comprising instructions to cause the processor to issue a command to the AR vehicle HUD display system of one of an electric vehicle and an internal combustion engine vehicle.

17. A method for providing a graphical representation of following distances to an augmented reality (AR) vehicle heads-up-display (HUD) system of a trailing vehicle comprising:

enabling access to a vehicle type database comprising a plurality of vehicle type profiles, each of the plurality of vehicle type profiles being associated with a vehicle type having a vehicle type specific aerodynamic profile and including optimal following ranges associated with the vehicle type, each of the optimal following distance ranges being based on the vehicle type specific aerodynamic profile of the vehicle type and a vehicle speed of the vehicle type wherein a trailing vehicle disposed in the optimal following range is configured to operate at an optimal fuel efficiency;

receiving a first vehicle type and a first vehicle speed associated with a leading vehicle on a road;

identifying a first optimal following distance range based on the first vehicle type and the first vehicle speed using a first vehicle type profile associated with the first vehicle type; and issuing a command to the AR vehicle HUD display system to display a graphical representation of the first optimal following distance to overlay an actual view of the road.

18. The method of claim 17, further comprising:

enabling access to the vehicle type database comprising the plurality of vehicle type profiles, wherein each of the plurality of vehicle type profiles associated with the vehicle type further comprises hazardous following distance ranges associated with the vehicle type, each of the hazardous following distance ranges being based on the vehicle speed of the vehicle type and disposed in front of the optimal following distance range associated with the vehicle speed;

identifying a first hazardous following distance range based on the first vehicle type and the first vehicle speed using the first vehicle type profile; and issuing the command to the AR vehicle HUD display system to display a graphical representation of the first hazardous following distance range and first optimal following distance range to overlay an actual view of the road.

19. The method of claim 18, further comprising:

receiving a vehicle location of the trailing vehicle from a vehicle sensor system of the trailing vehicle;

receiving a vehicle location of the leading vehicle from one of the vehicle sensor system of the trailing vehicle and a V2V message including the vehicle location of the leading vehicle from the leading vehicle;

determining a current following distance between the trailing vehicle and the leading vehicle based on the vehicle location of the trailing vehicle and the vehicle location of the leading vehicle;

determining a current following distance range disposed in a portion of the current following distance between the trailing vehicle and the optimal following distance range, the trailing vehicle disposed in the current following distance range is configured to operate at a fuel efficiency that is less than the optimal fuel efficiency; and issuing the command to the AR vehicle HUD display system to display a graphical representation of the first hazardous following distance, the first optimal following, and the current following distance range to overlay an actual view of the road.

20. The method of claim 19, further comprising issuing the command to the AR vehicle HUD display system to display the graphical representation of the first hazardous following distance, the first optimal following, and the current following distance range to overlay an actual view of the road using first, second, and third colors, respectively.

* * * * *